United States Patent [19]

Modot et al.

[11] Patent Number: 4,908,219

[45] Date of Patent: Mar. 13, 1990

[54] PROCESS FOR FERMENTATION

[75] Inventors: Marcel Modot, Canet; Philippe De Lapasse, Landorthe; Francois Maistre, Villeneuvette, all of France

[73] Assignee: Societe Cooperative Agricole de Canet, Canet, France

[21] Appl. No.: 218,978

[22] Filed: Jul. 14, 1988

[30] Foreign Application Priority Data

Jul. 22, 1987 [FR] France ................................ 87 10375

[51] Int. Cl.$^4$ .............................................. C12G 1/00
[52] U.S. Cl. ....................................... 426/15; 426/11; 426/387; 426/592; 426/494; 99/276
[58] Field of Search ................... 426/11, 387, 15, 592, 426/419, 494, 14; 99/276

[56] References Cited

U.S. PATENT DOCUMENTS 4,626,437 12/1986 Schobinger et al. ................. 426/14

FOREIGN PATENT DOCUMENTS 0077745 4/1983 France ................................. 426/14

Primary Examiner—Marianne Cintins
Attorney, Agent, or Firm—Young & Thompson

[57] ABSTRACT

In the fermentation process, the vapors emitted from the fermentation vat, resulting from fermentation and entrained by the $CO_2$, are subjected to condensation. This condensation is effectuated fractionally in at least two successive stages (5, 7) operating at temperatures of about $-5°$ C. to $-15°$ C. in the first stage and $-15°$ C. to $-50°$ C. in the second stage. The process is effective to improve the quality and/or the quantity of fermentation product, in particular of wine in the case of grapes fermentation.

5 Claims, 1 Drawing Sheet

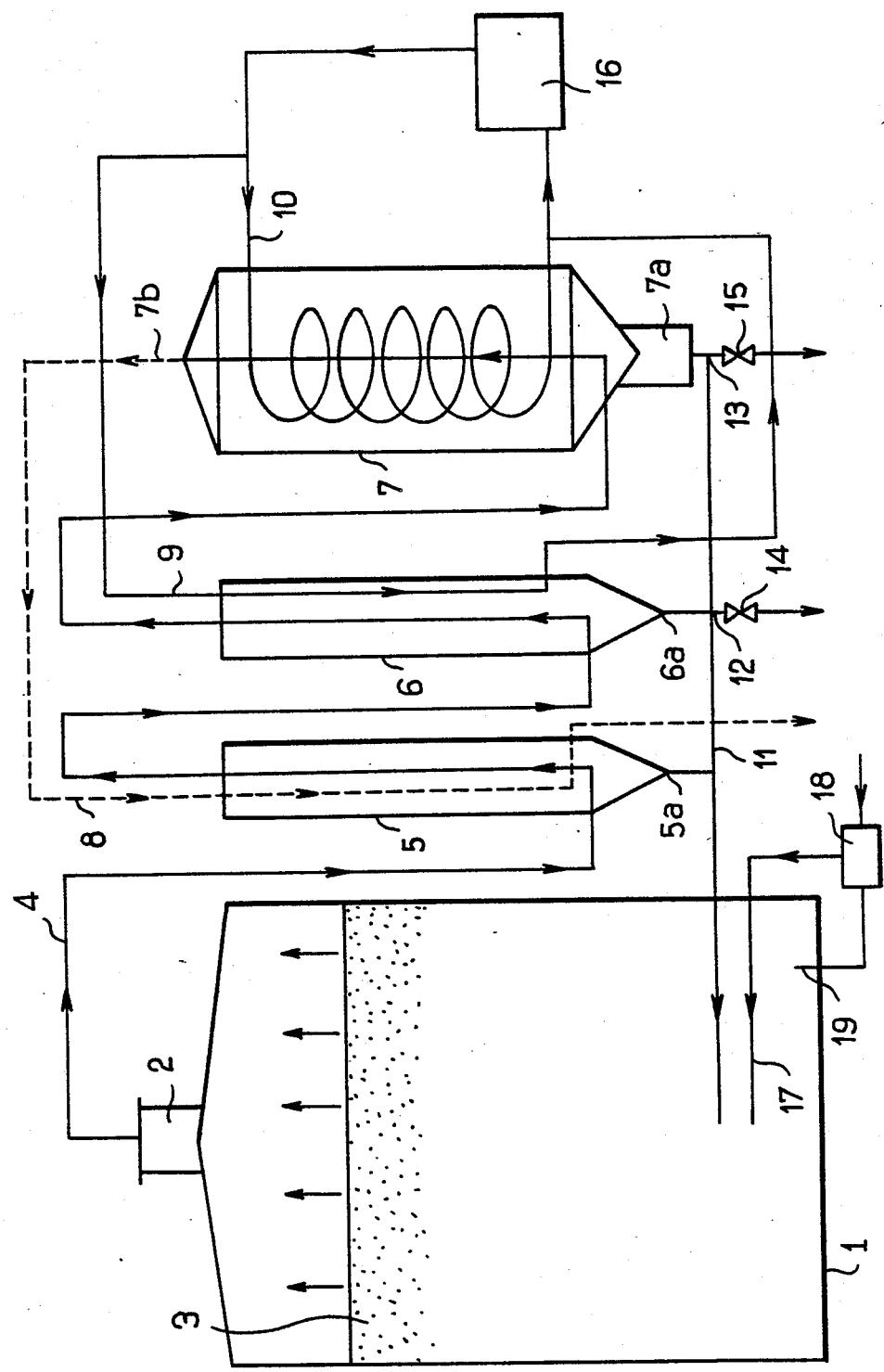

PROCESS FOR FERMENTATION

The present invention relates to an improved fermentation process and a fermentation apparatus for practicing this process. The invention is primarily, but not limitatively, related to grapes fermentation.

It is known that all fermentation processes generate carbonic gas which escapes to the atmosphere carrying aromatics, alcohol distillates and water vapor.

The works of GAY-LUSSAC and PASTEUR give the chemical balance of the vinous alcoholic fermentation:

48.4 g ethyl alcohol
46.6 g carbonic anhydride (23.65 liters)
3.2 g glycerine
0.6 g succinic acid
1.3 g yeast
per 100 g of grape sugar.

Numerous attempts have been made to recover the alcohols, the aromatics, the fusel oils and the carbonic anhydride which emanate from vinification vats. In particular, there is disclosed in French patent No. 2 307 037 a process in which the vapors emitted from the vinification vats are condensed and then reintroduced into these latter.

The object of this condensation was to be able to reintroduce the condensates into the vinification vat to augment the alcohol content of the wine.

The practical results of all these attempts were bad: erratic operation of the condensation column, insufficient recovery of the alcoholic products, negative organoleptic effect, etc.

Over a long period of time, the applicant carried out experiments, measurements and analyses to identify the probable causes of these failures and to find their solution. The causes were numerous, and a certain number will be discussed hereinafter. It appears, however, that the corrective measures lead in the same direction, namely: the replacement of the simple condensation by fractional condensation, carried out according to precise rules.

In fact, wine is not a simple hydroalcoholic solution, and the legal definition "product of the fermentation of fresh grapes or of juice of fresh grapes" indicates clearly that the wine is the result of the biological transformation of a biological product. The advent of modern analytical techniques (gas phase chromatography with improvement of the capillary columns of graft phase, high performance liquid chromatography, mass spectrometry) have permitted the identification and the quantitative measurement of nearly 600 compounds, mostly volatile ones including about 200 esters, about 50 alcohols, about 20 acetals, etc. Throughout the fermentation, certain compounds are totally or partially transformed, others remain unaltered: hence the development of color, taste, aroma, which is to say the quality of the final product. The concept of flavor (taste plus aroma) is evaluated by the chemist taking into consideration the chemical constituents which produce the sensation: the oenologist evaluates the responses which these constituents evoke from the consumer.

The constituents have heavy or light molecules. Proceeding on the conclusions of the chemist and the oenologist, it is thus possible to determine the thresholds of selection by fractional condensation, and the choice between the reintegration of the condensates in the vat or their elimination.

The object of the present invention is thus to overcome the drawbacks of known ways by providing an improved vinification process which permits increasing either the flavor of the wine or the amount of production of the wine, and more generally, an improved fermentation process, as well as an apparatus for practicing said process.

According to the invention, the fermentation process in which the vapors emitted from the fermentation vats, resulting from fermentation and entrainment by the $CO_2$, are subjected to condensation, is characterized in that the latter is effectuated in a fractional manner according to at least two successive stages operating at temperatures of about $-5°$ C. to $-15°$ C. in the first stage and $-15°$ C. to $-50°$ C. in the second stage.

Thus, according to the process embodying the invention, there is condensed in a first stage substantially water and the heavy alcohols and in a second stage essentially the light alcohols.

According to a preferred embodiment of the invention, at least a part of the recovered condensates are reintroduced into the vat or vats.

According to a preferred embodiment of the invention, there is reintroduced into the vat or vats a condensate whose ratio of heavy alcohols to light alcohols favors light alcohols.

The condensate rich in light alcohols is that recovered in the second condensation stage. The light alcohols rich in aromatics reintroduced into the vats permit improving the quality of the wine, in the case of vinification.

When it is necessary to improve only the amount of production of the wine, there is reintroduced into the vat or vats all of the recovered condensates.

Preferably, the $CO_2$ leaving the vat or vats is recovered and compressed and/or liquefied.

This $CO_2$ may be used as a refrigerant fluid in the condensation stages.

According to a preferred embodiment of the invention, the recovered $CO_2$ is injected at the base of the vat or vats to agitate the contents of this latter or these latter and to promote the fermentation reactions.

The quantity of $CO_2$ injected at the base of the vat or vats may be a function of the temperature of the contents of this latter or these latter to adjust this temperature.

Moreover, the $CO_2$ produced by the process according to the invention may also be utilized for protection against oxidation and to avoid temperature rise in the stored fruits and other vegetal products, after their harvesting and before their introduction into the fermentation apparatus.

According to another aspect of the invention, the fermentation apparatus for practicing the process according to the invention is characterized in that the upper part of the fermentation vat or vats is connected to at least two successive condensation columns cooled by a refrigerant fluid, means being provided to regulate the internal temperature of the first column to a value between $-5°$ C. and $-15°$ C. and the internal temperature of the second column to a value between $-15°$ C. and $-50°$ C.

Other features and advantages of the invention will become apparent from the following description. The accompanying single FIGURE, given by way of non-limiting example, is a schematic view of an apparatus according to the invention.

There will first be described the vinification apparatus according to the invention, referring to the accompanying drawing.

It is seen in this FIGURE that the upper part 2 of the fermentation vat 1 containing the grapes 3 undergoing fermentation is connected by tubing 4 to three successive condensation columns 5, 6, 7, cooled by a refrigerant fluid 8, 9, 10.

The temperature and the flow rate of the refrigerating fluids 8, 9, 10 are chosen so as to be able to adjust the internal temperature of the two first columns 5, 6 to a value between $-5°$ C. and $-15°$ C. and the internal temperature of the last column 7 to a value between $-15°$ C. and $-50°$ c.

According to a preferred embodiment of the invention, the internal temperature of the two first columns 5, 6 is controlled between $-5°$ C. and $-10°$ C. for the first column 5 so as to condense principally water and between $-10°$ C. and $-15°$ C. for the second column 6 so as to condense principally heavy alcohols.

It will also be seen from the accompanying figure that the lower part 5a, 6a, 7a of the condensation columns 5, 6, 7 is connected to the fermentation vat 1 by tubing 11 to reintroduce into this vat all or a portion of the condensates formed in the columns. Tubing 11 has in association with the lower parts 6a, 7a of the columns 6, 7 branches 12, 13 provided with valves 14, 15 which permit recovering the condensates.

The $CO_2$ emerging from the fermentation vat 1 is recovered, after passing through columns 5, 6, 7, from the top (see reference 7b) of the last column 7. This $CO_2$ cooled to a temperature between $-15°$ C. and $-50°$ C. in the column 7 is introduced as refrigerant fluid into the first column 5 (see tubing 8) to cool this latter to a temperature of the order of $-5°$ C. to $-10°$ C.

The refrigerant fluid 9, 10 used to cool the columns 6 and 7 is ethanol. This latter is cooled in a cooler 16. A portion of this ethanol is sent by tubing 10 to the column 7 and another part by tubing 9 to the column 6.

The temperatures of the interior of columns 6 and 7 are adjusted as a function of the temperature and of the flow rate of the ethanol in the tubing 9 and 10.

A portion of the $CO_2$ emerging from the column 7 may be compressed and/or liquefied for other uses.

A portion of the recovered $CO_2$ is reintroduced into the base of vat 1 by tubing 17 to agitate the contents of this vat and to adjust the temperature of the latter. With the aid of a flow rate regulator 18 associated with a temperature probe 19 disposed in the interior of the vat 1, the quantity of $CO_2$ reintroduced at low temperature at the base of vat 1 can be adjusted as a function of the temperature prevailing in this vat to adjust this temperature.

There will now be described in greater detail the process according to the invention, beginning with the description of the various condensate fractions which are produced during the practice of the process and the results that follow therefrom.

1—First Condensate: is the water itself.

The condensation of the water is very good as soon as a temperature of about 0° C. is reached. On the contrary, if much lower temperatures are used, the condensation is abrupt and may result in the formation of ice. It entails irregular operation with possible unacceptable proportions if the freezing is substantial. In a mixture subjected to condensation, it is known that the freezing temperature falls about 1° C. for each 2% of alcohol present. For a condensate containing 20% alcohol (the content encountered at the beginning of the fermentation phase as well as at the end of fermentation) the freezing point is thus only $-10°$ C. Certain researchers, seeking to condense vapors with higher alcohol content, have utilized temperatures substantially less than $-10°$ C. as mentioned: they have then come up against the phenomenon of freezing when the alcohol content was too low.

2—Second group of condensates: these are alcohols and other heavy organic products.

These products are the first to condense after water, and it has been determined that the disagreeable flavors were associated with these products, more particularly with products of a weight of the order of 1,000 g/l and above. The elimination of the heavy products or their amalgamation conduces to a high quality wine.

3—Third group of condensates: light alcohols and aromatics.

The flavor of the wine is stabilized with the ratio of heavy alcohols/light alcohols: it is as to this that the oenologist and his skill are important. Experience and testing have demonstrated a certain qualitative advantage when the light alcohols predominate over the heavy. The condensation of this third group of condensates can be effected only below $-30°$ C., which can be realized only when eliminating the risk of freezing indicated in paragraph 1 "First condensate".

4—Fourth condensate: carbonic anhydride

The purity of the recovered $CO_2$ is a function of the temperature level used in phase 3. Loaded as it is, even at low concentration, with light alcohols and aromatics, this carbon dioxide is unsuitable for a certain number of applications, particularly in nutriment and medication: it must be subjected to a certain number of treatments destined to remove undesired components. It is therefore a product of limited utility.

On the other hand, if the final condensation has been carried out at a sufficiently low temperature, the $CO_2$ can be used for its full range of applications, including nutrition, which improves the economy of the installation.

The parameters of the problems having thus been defined, it is possible to choose methods of embodiment permitting optimization of these factors.

In practice, it is necessary to deal with a wide range of compositions of condensates, from one region to another, and from one year to another. The gamut of wines offered to the consumer amply demonstrates the magnitude of the problem. It is no less true that the organic products contained in the gas range from zero at the beginning of fermentation to more than 50% at the peak of fermentation before returning to zero. Moreover, for obvious economic reasons, plural fermentation vats are unavoidably associated with the selection system. For reasons of production, the vats are never in the same phase of fermentation, and installation will accordingly operate only occasionally under steady state conditions. The process and the installation according to the invention permit obtaining all of the objects recited above.

The process according to the present invention consists in providing fractional condensation, in at least two columns or stages of condensation according to the outline of the accompanying drawing.

The process practiced is as follows:

In a first stage (columns 5 and 6), water and heavy fractions are condensed. For this purpose, the refrigerant 9 operates in the range −5° C. to −15° C. This stage has two principal functions:

it protects the columns or following stages from the danger of freezing having regard for the temperature of the refrigerant and that of the gas leaving the vats, it substantially eliminates heavy alcohols from the downstream treatment circuit, thus giving the oenologist the choice of possibilities to eliminate or mix these components in predetermined proportions. In this stage, the column 5 operates as a gas/gas exchanger, the refrigerant 8 which is used being purified $CO_2$ recovered at the outlet of the circuit of the installation.

In the second stage, the column which is used is a liquid/gas exchanger, whose refrigerant (ethyl alcohol, $CO_2$, etc.) permits achieving temperatures lower than −30° C., to obtain (the risk of freezing having been eliminated by the first column or stage) a condensation of the remaining alcohols. These light alcohols, containing aromatics, are reintroduced, according to the judgment of the oenologist in the fermentation vats. They increase the alcohol content by about 2 to 3/10 degrees as has been demonstrated in more than 14 vinification operations.

This second column or stage permits among other things the production of nutritional quality $CO_2$, of high purity and market value.

The use of two columns or stages is the minimum necessary. The use of supplemental columns or stages is often advantageous for condensates selection.

Thus, as indicated in the accompanying figure, the first column may be twinned, so as to obtain a first condensate based on water in phase 1, and based on heavy alcohols in phase 2. The mixtures thus obtained avoid surcharging the following stages or columns; it is thus not necessary to overdesign the apparatus and to increase the cost of production.

Accordingly as it is sought to condense substantially all of the light products, it may be desirable to increase the number of columns or plates, to limit the volume of the condensates in each stage, and to regulate the low temperatures in each of these from a standpoint both of technique and of economy.

The process according to the invention has also the following features:

Purified $CO_2$ as explained above is recovered, compressed for certain immediate uses, liquefied to be used in other fields or sold.

For columns or heat exchangers, the ethyl alcohol or other cryogenic fluid will be conventionally used, but in each case, all the necessary precautions must be taken to avoid contact of wine and refrigerant in the circuit. One solution consists in using the liquid $CO_2$ as refrigerant, produced in the cycle, which has neither the danger nor even the risk of ecological contamination. The use of $CO_2$ from the circuit has a substantial economy of construction and operation.

Control of the vinification temperatures affects the final product quality, and if each wine has an ideal elaboration temperature, it is known that for each degree of alcohol formed, the vat temperature rises by 1.3° C. However the ideal range, according to color, is between 15° and 25° C., as the maximum temperature of the vat. It follows that, under certain conditions of grapes supply and variations of ambient temperature and various biological factors, the vat temperature increases sharply. It is then said that the vat surges, which can affect the quality, and leads to overflow of liquid. The applicant seeks to provide a regulation of instantaneous temperature, permitting the introduction of liquefied $CO_2$ into the vat, retarding or preventing surges, and permitting the oenologist to control by conventional means the fermentation, which gives a temperature difference greater than 80° C. This operation has a tremendous effect on the quality of vinification.

The fractional condensation may be so conducted that the $CO_2$ leaving the condensation columns will have a substantially constant temperature, compatible with the control system, which avoids passing through too great a liquid phase, which would be undesirable.

To obtain good thermal exchange between the $CO_2$ and the liquid material, it is recommended to inject the $CO_2$ near the base of the vat, so as to increase agitation in the vat and to facilitate good vinification. There is thus effected an increase in the speed of the process.

A final improvement has been effected in the previnification phase. The gathered bunches of grapes have to stored in baskets, as grapes gathered by harvesting machines, before being introduced into the vat. There results an onset of highly undesirable fermentation, particularly with a period of high heat. The applicant has provided for storage under $CO_2$, under inert conditions, but moreover preventing temperature increase in the gathered grapes.

We claim:

1. A vinification process using at least one fermentation vat from which escapes during fermentation a vapor mixture of water vapor, aroma constituents, alcohols and $CO_2$, said process comprising subjecting at least a part of said vapor mixture to a first condensation at a temperature comprised between −5° C. and −15° C. thereby to produce a first condensate and a further vapor mixture rich in alcohols and aroma constituents, and subjecting said further vapor mixture to a second condensation at a temperature comprised between −15° C. and −50° C., thereby to produce a second condensate rich in alcohols and aroma constituents, wherein at least a part of said second condensate is reintroduced in the fermentation vat.

2. A vinification process according to claim 1, further comprising the steps of recovering the $CO_2$ leaving the fermentation vat and liquefying the recovered $CO_2$.

3. A vinification process according to claim 2, wherein the said recovered $CO_2$ is used as a refrigerant fluid in the said condensation steps.

4. A vinification process according to claim 2, wherein the said recovered $CO_2$ is reinjected at the base of the fermentation vat.

5. A vinification process according to claim 4, wherein the quantity of $CO_2$ reinjected in the fermentation vat is predetermined as a function of the temperature inside of the vat, to adjust said temperature.

* * * * *